United States Patent
Dai et al.

(10) Patent No.: US 10,560,996 B2
(45) Date of Patent: Feb. 11, 2020

(54) DIMMING PROCESSING SYSTEM FOR LED LAMPS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Jiayun Dai, Zhejiang (CN); Pengyuan Zhao, Zhejiang (CN); Xiaobo You, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/146,046

(22) Filed: Sep. 28, 2018

(65) Prior Publication Data
US 2019/0132926 A1    May 2, 2019

(30) Foreign Application Priority Data
Oct. 30, 2017   (CN) .......................... 2017 1 1033023

(51) Int. Cl.
H05B 33/08    (2006.01)
H05B 37/02    (2006.01)
G06F 3/0484   (2013.01)
G06F 3/0488   (2013.01)

(52) U.S. Cl.
CPC ..... *H05B 33/0863* (2013.01); *H05B 37/0272* (2013.01); *G06F 3/04847* (2013.01); *G06F 3/04883* (2013.01); *Y02B 20/346* (2013.01)

(58) Field of Classification Search
CPC .................. H05B 33/0863; H05B 33/0272
See application file for complete search history.

(56) References Cited

U.S. PATENT DOCUMENTS

| | | | | |
|---|---|---|---|---|
| 2009/0153352 | A1* | 6/2009 | Julio | H05B 33/0863 340/4.3 |
| 2009/0200967 | A1* | 8/2009 | Bergman | H05B 33/0863 315/363 |
| 2010/0277340 | A1* | 11/2010 | Julio | H04Q 9/04 340/9.11 |
| 2013/0162172 | A1* | 6/2013 | Baaijens | H05B 33/0863 315/292 |
| 2018/0326900 | A1* | 11/2018 | Chen | B60Q 3/74 |
| 2019/0034043 | A1* | 1/2019 | Zolotykh | H05B 37/02 |

* cited by examiner

*Primary Examiner* — Raymond R Chai
(74) *Attorney, Agent, or Firm* — Wang Law Firm, Inc.

(57) ABSTRACT

A dimming processing system for an LED lamp includes a signal input area, a plurality of color trigger switches located in the signal input area, an HSV color selection area composed of the plurality of color trigger switches, and a non-color selection area located in the signal input area, a value module, and a dimming processing module. The value unit is configured to turn on one of the selected color trigger switches in the last selected HSV color selection area having the largest distance from the pole of the polar coordinate system when one of the color trigger switches is sequentially switched to select one of the selection switches or when one selection switch and one color trigger switch are simultaneously selected, and the HSV value corresponding to the color trigger switch is extracted, thereby avoiding blurring and uncertainty of finger sliding.

8 Claims, 2 Drawing Sheets

DIMMING PROCESSING SYSTEM FOR LED LAMPS

CROSS-REFERENCE TO A RELATED APPLICATION

This application claims priority to a Chinese Patent Application No. CN 201711033023.2, filed on Oct. 30, 2017.

FIELD OF THE TECHNOLOGY

The present invention relates to lighting field, with particular emphasis on a dimming processing system for LED lamps.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As mentioned above, the use of light-emitting diodes as light-emitting sources has the advantages of power saving and greater brightness, so it has gradually become common in use.

With the popularity of LED lamps, more and more occasions have begun to use LED lamps. Due to the development of LED chip technology, different LED chips can emit different colors of light by adding different phosphors to the LED chips. And in the existing control mode of the dimming and toning of LED chip, due to the development of the communication technology, more and more mobile devices such as mobile phones and tablets are used to control the color of the RGB lamps. HSV color disk is often used for color control. The HSV color wheel is a color control swatch made based on the HSV (Hue, Saturation, Value) color model. HSV (Hue, Saturation, Value) is a color space created by A. R. Smith in 1978 based on the intuitive nature of color, also known as the Hex cone Model. In the HSV color model, each HSV value consists of three parameters, hue (H), saturation (S), and lightness (V). The HSV color wheel is a color disk composed of a plurality of HSV values, and has the characteristics of intuitive color and convenient operation. However, there are edges on the color wheel. When the finger slides along the edge, due to the blur and uncertainty of the finger sliding, the finger will often run out of the edge of the HSV color disk and cause the failure of color selection, thus affecting the smooth effect of the color picking point on the HSV color disk following the finger movement and the continuity of data selection.

SUMMARY OF THE INVENTION

Therefore, the present invention provides a dimming processing system for an LED lamp that can improve the smoothing effect of finger movement and the continuity of data selection to solve the above problem.

A dimming processing system for LED lamps comprises a signal input area, the dimming processing system further comprises a plurality of color trigger switches located in the signal input area, an HSV color selection area composed of the plurality of color trigger switches, and a non-color selection area located in the signal input area, a value module, and a dimming processing module, each of the color trigger switches corresponding to an HSV value, and only one color trigger switch is triggered at a time, the HSV color selection area is a circular area composed of multiple color trigger switches, the position of each color trigger switch in the circular area is represented by a polar coordinate system, the non-color selection area comprises a plurality of selection switches, and the value module is configured to turn on the one of the selected color trigger switches in the last selected HSV color selection area having the largest distance from the pole of the polar coordinate system when selecting the at least one of the color trigger switches is sequentially switched to select at least one of the selection switches or when the at least one selection switch and the at least one color trigger switch are simultaneously selected, and the HSV value corresponding to the color trigger switch is extracted, the dimming processing module adjusts the HSV value of the light emitted by the LED lamp according to the HSV value corresponding to the turned-on color trigger switch.

Advantageously, when any one of the color trigger switches is turned on, the plurality of selection switches are turned off.

Advantageously, the signal input area is a mobile phone touch input screen.

Advantageously, when and only when multiple color trigger switches are selected, the value module causes any of the multiple color trigger switches to be switched on and extracts the HSV value of the color trigger switch that is switched on.

Advantageously, the color trigger switch is turned off when any one of the plurality of selection switches is triggered.

Advantageously, the HSV value is composed of a hue value, a saturation value, and a brightness value.

Advantageously, the value module further comprises a comparison unit, the comparison unit is configured to compare the distance between each selected color trigger switch and the pole of polar coordinates with the pole diameter length value of the polar coordinates when selecting at least one of the color trigger switches is sequentially switched to select at least one of the selection switches or the at least one selection switch and the at least one color trigger switch are simultaneously selected.

Advantageously, the dimming processing system of the LED lamp further comprises a data conversion module, the data conversion module is configured to rotate the HSV value extracted by the value module to an RGB value, and the dimming processing module is electrically connected with the data conversion module and the RGB value is output by the data conversion module.

Advantageously, when selecting at least one of the selection switches to select at least one of the color trigger switches, the value module selects any one of the selected color trigger switches to be turned on, and extracts the HSV value corresponding to the turned-on color trigger switch.

Compared with the prior art, the dimming processing system provided by the present invention can select the turned-on color trigger switch according to the order in which the color trigger switch and the selection switch are selected, and the position of the last selected HSV color selection area. Especially when sliding from the HSV color selection area to the non-color selection area, the one of the selected color trigger switches having the largest distance from the pole of the polar coordinate system is selected, thereby avoid the blurring and uncertainty of the finger sliding, resulting in the phenomenon of edge color loss failure, which can ensure the smoothing effect of finger movement and the continuity of data selection.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
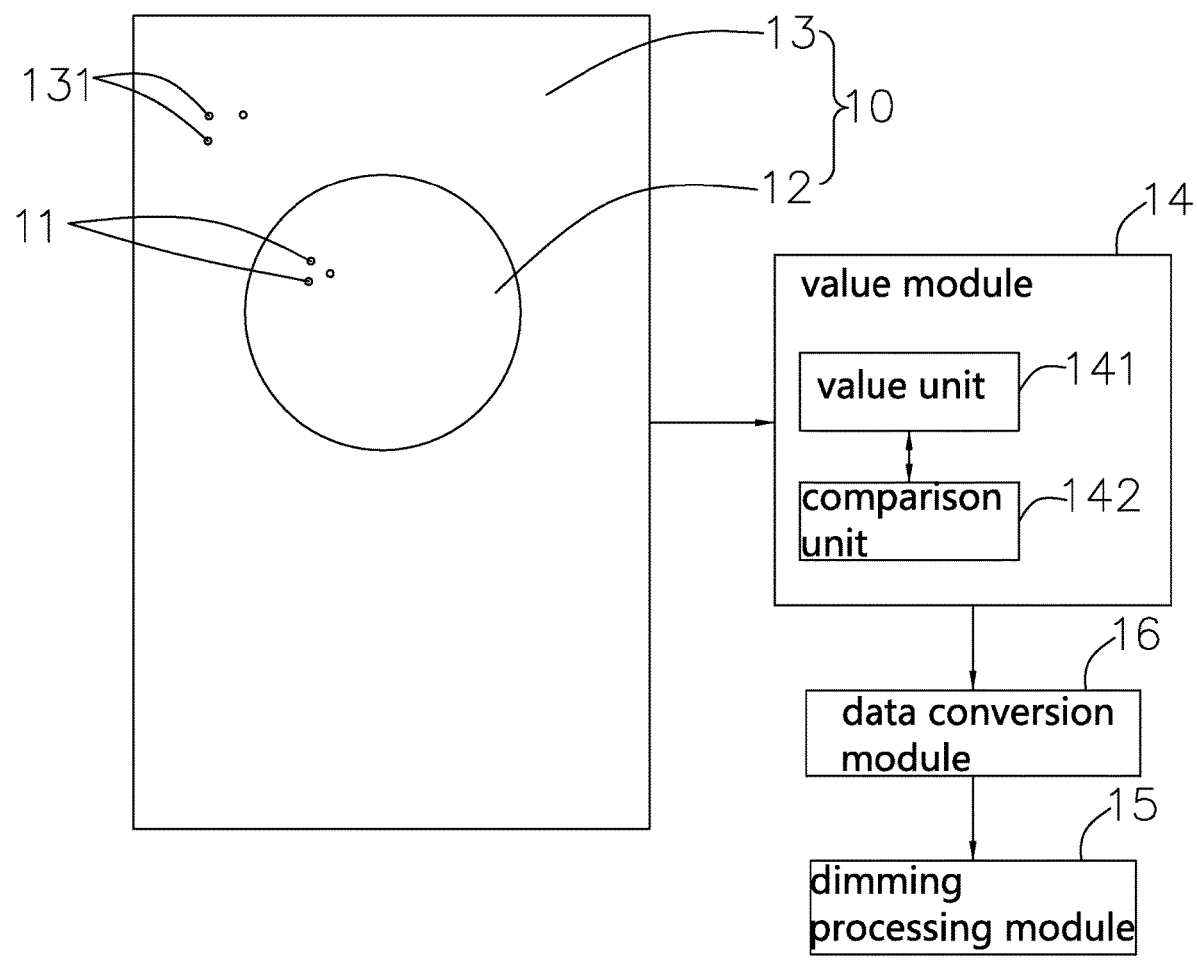
FIG. 1 is a schematic block diagram of a dimming processing system for an LED lamp provided by the present invention.
Figure 2:
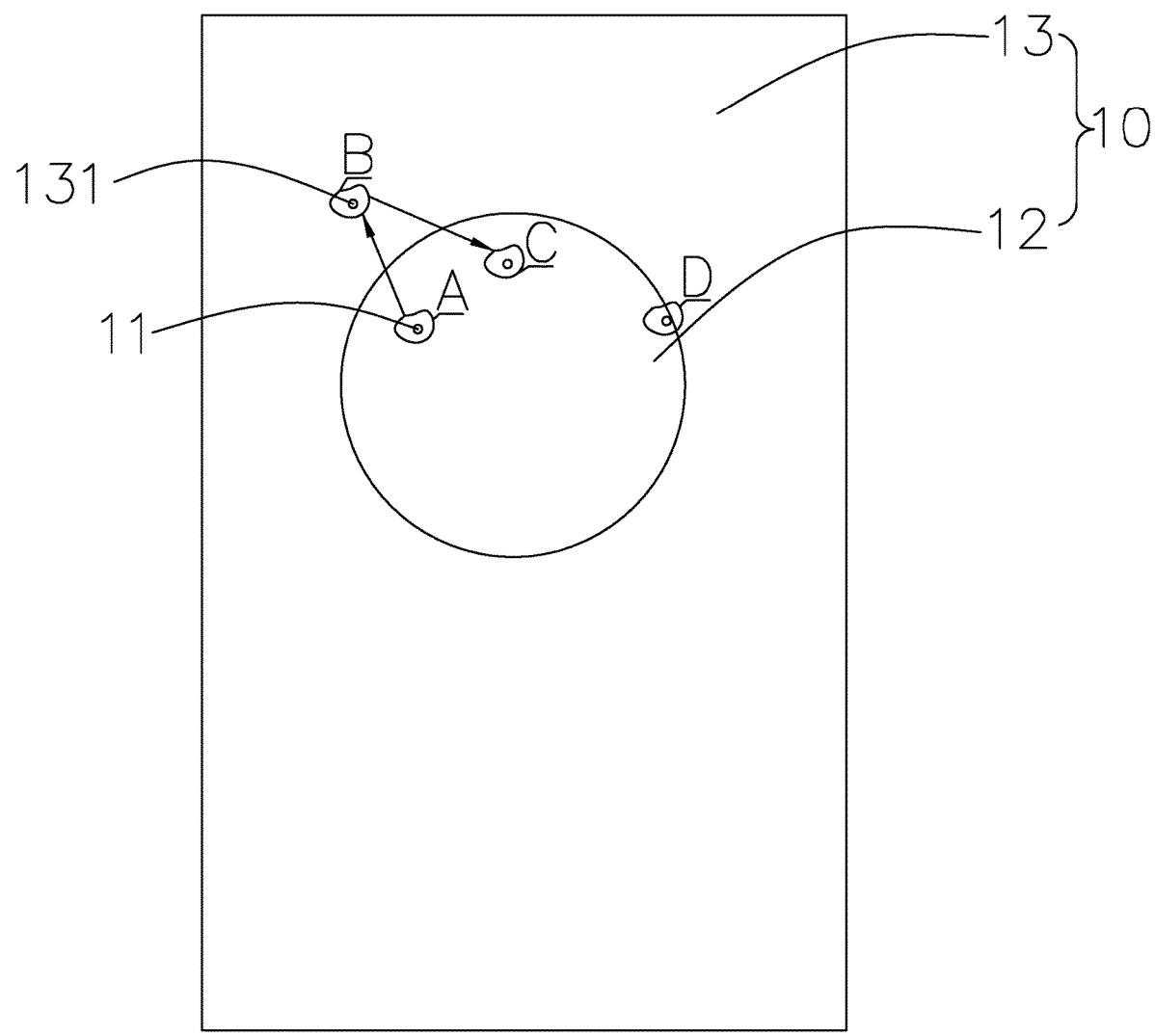
FIG. 2 is a schematic diagram of several situations in which a user's finger touches the HSV color selection area of the dimming processing system of the LED lamp of FIG. 1.

Please referring to FIG. 1 to FIG. 2, it is a schematic structural diagram of a dimming processing system 100 for an LED lamp provided by the present invention. First, it should be noted that the dimming processing system 100 of the LED lamp not only comprises an LED lamp, but also comprises a power source electrically connected to the LED lamp, a controller that controls the output of the power source, and input terminals such as mobile phones and tablet computers that communicate with the controller in a certain way, such as WIFI and DALI. The LED lamp should comprise at least one LED chip of one of three colors of RGB. As for the power supply for the LED lamp, the controller, the mobile phone, etc., the communication mode between the terminal and the controller, and the control of the output of the power supply by the controller to adjust the output of the LED lamp should be in the field. The techniques known to the skilled person need not be described in detail here. The dimming processing system 100 of the LED lamp comprises a signal input area 10, a plurality of color trigger switches 11 located in the signal input area 10, and an HSV color selection area 12 composed of the plurality of color trigger switches 11. A non-color selection area 13 in the signal input area 10, a value module 14, and a dimming processing module 15. It is conceivable that the dimming processing system 100 of the LED lamp may further comprise other functional modules, such as a signal transmitting module, a signal receiving module, a signal processing module, and the like, or a software or hardware function module, and may also comprise a processor, a wire. A hardware functional module such as a memory, which should be known to those skilled in the art, will not be described herein.

The signal input area 10 is used for a user input control signal, which may be a touch input screen of a mobile phone, a touch input screen of a tablet computer, or a touch input screen of other communication devices, or may be the area composed of a plurality of buttons. For other communication devices, it can also be an electronic device with a touch input screen that is customized to control the output of the LED lamp. In this embodiment, the signal input area 10 is a touch input screen of a mobile phone. As is well known, the touch input screen of a mobile phone is a capacitive screen or a resistive screen, etc., which are actually composed of a plurality of switches, that is, when the input screen is touched, one of the switches is turned on, and when there is no touch, all the switches are disconnect. The capacitive screen controls the switch to work on or off through a capacitor. The resistive screen controls the switch to work on or off through a resistor. The on/off of the switch is 0 and 1 in the binary, so that a series of 0 or 1 can be input through the touch screen to form a certain control signal. The above should also be known to those skilled in the art and will not be described in detail herein.

The color trigger switch 11 is located in a plurality of locations in the signal input area 10. The plurality of color trigger switches 11 correspond to a plurality of HSV values, that is, each of the color trigger switches 11 corresponds to one HSV value. According to the HSV color model, a plurality of HSV values constitutes an HSV color wheel which is a circular plane in a two-dimensional plane. Each point in the plane corresponds to an HSV value. Each of the HSV values consists of a hue value, a saturation value, and a brightness value. Of course, from the perspective of the structure and working principle of the touch screen, each pixel of the touch screen corresponds to a color trigger switch 11, that is, an HSV value. Therefore, the area occupied by each pixel or each color trigger switch 11 is small, so when the user clicks or dials the HSV color wheel with a finger, a plurality of color trigger switches 11 are selected. It is well known that when a user's finger is disengaged from the touch screen, a random or arbitrary switch in the last area touched by the finger is selected to be turned on, thereby completing the input of the user command.

The HSV color selection area 12 is composed of a plurality of the color trigger switches 11, which are the areas on which the HSV color wheel is presented on the touch screen. According to the HSV color module, the HSV color selection area 12 should be a circular area. The position of each of said color trigger switches 11 within the circular area is characterized by a polar coordinate system. It is well known that the polar coordinate system is a plane composed of an infinite number of ordered pairs M ($\rho$, $\theta$), where $\rho$ is called the polar diameter of the point M, and $\theta$ is called the polar angle of the point M. Therefore, the distance from the color trigger switch 11 on the most edge of the HSV color selection area 12 to the pole of the polar coordinate system is the maximum polar diameter of the polar coordinate system.

The non-color selection area 13 is also located in the signal input area 10, and together with the HSV color selection area 12 constitutes the entire signal input area 10. The non-color selection area 13 also comprises a plurality of selection switches 131. When any one of the color selection switches 11 in the HSV color selection area 12 is turned on, the plurality of selection switches 131 will be turned off. Similarly, when any one of the plurality of selection switches 131 is triggered, all of the color trigger switches 11 are also turned off. It can be understood that if an input screen does not have the non-color selection area 13, that is, the entire screen is all of the HSV color selection area 12, there is no prior art, that is, when the finger slides along the edge, due to the blur and uncertainty of the finger sliding, the finger will often run out of the edge of the HSV color disk and cause the failure of color selection. In this case, the technique of the present invention may not be used.

The value module 14 further comprises a value unit 141 and a comparison unit 142. The value unit 141 is configured to turned on the one of the selected color trigger switches 11 in the last selected HSV color selection area 13 having the largest distance from the pole of the polar coordinate system when selecting the at least one of the color trigger switches 11 is sequentially switched to select at least one of the selection switches 131 or when the at least one selection switch 131 and the at least one color trigger switch 11 are simultaneously selected, and the HSV value corresponding to the color trigger switch 11 is extracted. As shown in FIG. 2, when the user's finger is sliding from the HSV color selection area 12 to the non-color selection area 13, a phenomenon in which at least one of the color trigger switches 11 is selected to switch to selecting at least one of the selection switches 131 occurs. That is, from point A to point B in FIG. 2. The phenomenon that at least one selection switch 131 and at least one color trigger switch 11 are simultaneously selected occurs when the user's finger does not slide, but the user's finger simultaneously touches the HSV color selection area 12 and the non-color selection area 13, as shown in the D zone of FIG. 2, at this time, the selection switch 131 and the color trigger switch 11 are simultaneously selected. In the above two cases, the value unit 141 turns on the one of the color trigger switch 11 that is the largest distance from the pole of the polar coordinate system in the last selected HSV color selection area 13. And the HSV value corresponding to the turned-on color trigger switch 11 is extracted. When the user's finger is sliding from the non-color selection area 13 to the HSV color selection area 12, a phenomenon in which switching from selecting at least one of the selection switches 131 to selecting at least one of the selection switches 131 occurs, that is, from point B to point C in FIG. 2. At this time, any one or a random one of the color selection switches 11 in the last selected HSV color selection areas 12 will be selected, and the value of the HSV corresponding to the selected color selection switch 11 is extracted by the value unit 141. Of course, it can be understood that the value unit 141 is further used when the area selected by the user is only all in the HSV color selection area 12, that is, if and only when the plurality of color trigger switches 11 are selected, as with the above-mentioned finger sliding from point B to point C, any one or a random one of the color selection switches 11 in the last selected HSV color selection areas 12 will be selected, and the selected unit 141 extracts the HSV value corresponding to the color selection switch 11. In order to accomplish the above tasks, the value module 14 further comprises a comparison unit 142. The comparison unit 142 is configured to sequentially switch to select at least one of the selection switches 131 when selecting at least one of the color trigger switches 11, or to select at least one of the color trigger switches 11 when selecting at least one of the selection switches 131 or to compare the distance between each selected color trigger switch 11 and the pole of polar coordinates with the pole diameter length value of the polar coordinates when the at least one selection switch 131 and the at least one color trigger switch 11 are simultaneously selected, such that the one of the color trigger switches 11 selected in the last selected HSV color selection area 13 having the largest distance from the poles of the polar coordinate system is selected. Then, the selected color trigger switch 11 is turned on by the value unit 141 and extracts the HSV value corresponding to the turned-on color trigger switch 11.

The dimming processing module 15 adjusts the HSV value of the light emitted by the LED lamp according to the HSV value corresponding to the turned-on color trigger switch 11. After the value module 14 obtains the HSV value, the dimming processing module 15 forms a dimming command according to the HSV value, and inputs the dimming command to the controller of the lamp, and then controls the power of the lamp by the controller. Thus, the HSV value of the light emitted by the LED lamp can be adjusted.

The dimming processing system 100 of the LED lamp further comprises a data conversion module 16. The data conversion module 16 is configured to rotate the HSV value extracted by the value module 14 into RGB. The data conversion module 16 is executed by a computer program by which HSV values are converted to RGB values. At least the computer program should be a technique known to those skilled in the art and will not be described in detail herein.

Compared with the prior art, the dimming processing system 100 provided by the present invention can select the turned-on color trigger switch 11 according to the order in which the color trigger switch 11 and the selection switch 141 are selected, and the position of the last selected HSV color selection area 12. Especially when sliding from the HSV color selection area 12 to the non-color selection area 13, the one of the selected color trigger switches 11 having the largest distance from the pole of the polar coordinate system is selected, thereby avoid the blurring and uncertainty of the finger sliding, resulting in the phenomenon of edge color loss failure, which can ensure the smoothing effect of finger movement and the continuity of data selection.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A dimming processing system for LED lamps, comprising:
   a signal input area, a plurality of electronic color trigger switches located in the signal input area, a hue, saturation, value (HSV) color selection area composed of the plurality of electronic color trigger switches, and a non-color selection area located in the signal input area,
   a value module, and
   a dimming processing module,
   each of the electronic color trigger switches corresponding to an HSV value, and only one electronic color trigger switch is triggered at a time,
   the HSV color selection area is a circular area, a position of each electronic color trigger switch in the circular area is represented by a polar coordinate system, the non-color selection area comprises a plurality of electronic selection switches, and
   the value module is configured to turn on one of the selected electronic color trigger switches in the HSV color selection area having the largest distance from a pole of the polar coordinate system when at least one of the electronic color trigger switches and at least one of the electronic selection switches are sequentially selected, or when the at least one electronic selection switch and the at least one electronic color trigger switch are simultaneously selected, and the HSV value corresponding to the electronic color trigger switch is extracted, the dimming processing module adjusts the HSV value of light emitted by the LED lamp according to the HSV value corresponding to the turned-on electronic color trigger switch;
   the value module further comprises a comparison unit, the comparison unit is configured to compare a distance between each selected electronic color trigger switch and the pole of polar coordinates with a pole diameter length value of the polar coordinates when at least one of the electronic color trigger switches and at least one of the electronic selection switches are sequentially selected, or the at least one electronic selection switch and the at least one electronic color trigger switch are simultaneously selected.

2. The dimming processing system for LED lamps as claimed in claim 1, wherein when any one of the electronic color trigger switches is turned on, the plurality of electronic selection switches are turned off.

3. The dimming processing system for LED lamps as claimed in claim 1, wherein the signal input area is a mobile phone touch input screen.

4. The dimming processing system for LED lamps as claimed in claim 1, wherein when and only when multiple electronic color trigger switches are selected, the value module causes any of the multiple electronic color trigger switches to be switched on and extracts the HSV value of the electronic color trigger switch that is switched on.

5. The dimming processing system for LED lamps as claimed in claim 1, wherein the electronic color trigger switch is turned off when any one of the plurality of electronic selection switches is triggered.

6. The dimming processing system for LED lamps as claimed in claim 1, wherein the HSV value is composed of a hue value, a saturation value, and a brightness value.

7. The dimming processing system for LED lamps as claimed in claim 1, wherein the dimming processing system of the LED lamp further comprises a data conversion module, the data conversion module is configured to convert the HSV value extracted by the value module to a red, green blue (RGB) value, and the dimming processing module is electrically connected with the data conversion module and the RGB value is output by the data conversion module.

8. The dimming processing system for LED lamps as claimed in claim 1, wherein when selecting at least one of the electronic color trigger switches, the value module selects any one of the selected electronic color trigger switches to be turned on, and extracts the HSV value corresponding to the turned-on electronic color trigger switch.

* * * * *